（12) United States Patent
Shahin

(10) Patent No.: US 10,395,161 B2
(45) Date of Patent: Aug. 27, 2019

(54) REMOTE KEYLESS ENTRY SYSTEM

(71) Applicant: Emad Shahin, Encino, CA (US)

(72) Inventor: Emad Shahin, Encino, CA (US)

( * ) Notice: Subject to any disclaimer, the term of this patent is extended or adjusted under 35 U.S.C. 154(b) by 0 days.

(21) Appl. No.: 16/111,211

(22) Filed: Aug. 24, 2018

(65) Prior Publication Data

US 2019/0065925 A1    Feb. 28, 2019

Related U.S. Application Data

(60) Provisional application No. 62/549,855, filed on Aug. 24, 2017.

(51) Int. Cl.
| | | |
|---|---|---|
| *G06K 19/06* | (2006.01) | |
| *G06K 19/077* | (2006.01) | |
| *G07C 9/00* | (2006.01) | |
| *G06K 19/07* | (2006.01) | |

(52) U.S. Cl.
CPC ... *G06K 19/07762* (2013.01); *G06K 19/0723* (2013.01); *G07C 9/00182* (2013.01); *G07C 2009/00277* (2013.01); *G07C 2009/00865* (2013.01)

(58) Field of Classification Search
CPC .......................... G06K 19/00; G06Q 20/206
USPC ............................ 235/382, 385, 492, 462.46
See application file for complete search history.

(56) References Cited

U.S. PATENT DOCUMENTS

| | | | |
|---|---|---|---|
| 9,744,943 B1 * | 8/2017 | Hiatt | .................. B60R 25/04 |
| 2007/0214848 A1 * | 9/2007 | Meyerle | ............. E05B 47/0011 |
| | | | 70/278.2 |
| 2015/0178532 A1 * | 6/2015 | Brule | ................. G06K 19/0717 |
| | | | 340/5.61 |
| 2016/0348398 A1 * | 12/2016 | Telljohann | ............. E05B 41/00 |

* cited by examiner

*Primary Examiner* — Daniel St Cyr
(74) *Attorney, Agent, or Firm* — Payam Moradian

(57) ABSTRACT

An all-in-one, keyless-entry, proximity system, in the form of an attractive line of adjustable and customizable, one-size fits-all finger rings, configured to wirelessly lock and unlock doors and other locks, such as home, automobile, or pad locks, upon approach. Convenient, space saving, and virtually impossible to lose, the Remote Ring would eliminate the need for consumers to carry a multitude of keys and key fobs, while making it a snap to lock and unlock doors and other locks on automobiles, lockers, and many other locking devices for which keys have traditionally been necessary.

10 Claims, 3 Drawing Sheets

REMOTE KEYLESS ENTRY SYSTEM

CROSS-REFERENCE TO RELATED APPLICATION

The present application is related to and claims priority from prior provisional application Ser. No. 62/549,855, filed Aug. 24, 2017 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of wireless communication devices and more specifically relates to an all-in one, keyless-entry, proximity system, in the form of an attractive line of adjustable and customizable, one-size fits-all finger rings, configured to wirelessly lock and unlock doors and other locks, such as home, automobile, or pad locks, upon approach.

2. Description of the Related Art

Consider, for example, the need we all have for keys: a key for the doors to our houses and offices, keys (or keyless-entry keyfobs) for our cars, keys for padlocks and lockers, mailboxes, utility sheds, keys for everything we wish to lock up and protect. And today, in an era where locks have become increasingly automated, we may have as many keyless-entry keyfobs as we have keys! Convenient as they are, keyless-entry keyfobs are more unwieldy to carry around than actual keys—but wouldn't it be nice if, with a single keyfob, you could lock or unlock all the locking devices in your life? The invention to be introduced and explored in the course of this report would offer consumers just such an all-in-one device, one that you would simply wear, and not have to carry around and find when you needed it.

Various attempts have been made to solve problems found in wireless communication devices art. Among these are found in: U.S. Pat. No. 4,354,189 to Jerome H. Lemelson; U.S. Pub. No. 2014/0102136 to Michael K. Warren; and U.S. Pat. No. 5,832,296 to Wang et al. This prior art is representative of finger ring wireless communication devices.

None of the above inventions and patents, taken either singly or in combination, is seen to describe the invention as claimed. Thus, a need exists for a reliable Remote Ring, an all-in-one, keyless-entry, proximity system, in the form of an attractive line of adjustable and customizable, one-size fits-all finger rings, configured to wirelessly unlock doors and other locks, such as home, automobile, or pad locks, upon approach and to avoid the above-mentioned problems.

BRIEF SUMMARY OF THE INVENTION

In view of the foregoing disadvantages inherent in the known wireless communication devices art, the present invention provides a novel Remote Ring. The general purpose of the present invention, which will be described subsequently in greater detail, is to provide an all-in-one, keyless-entry, proximity system, in the form of an attractive line of adjustable and customizable, one-size fits-all finger rings, configured to wirelessly unlock doors and other locks, such as home, automobile, or pad locks, upon approach.

Another embodiment of this invention is to provide a one-size fits-all bracelet configured to wirelessly communicate with a lock or locks just like the Remote Ring. Convenient, space saving, and virtually impossible to lose, the Remote Ring or Remote Bracelet would eliminate the need for consumers to carry a multitude of keys and key fobs, while making it a snap to unlock doors and other locks on automobiles, lockers, and many other locking devices for which keys have traditionally been necessary.

The Remote Ring is a compact, attractively styled finger ring, with a three-quarter length adjustable band and a rounded top, and featuring an internal RF (Radio Frequency) transmitter powered by a pill-type lithium-ion battery. In another embodiment, the Remote Ring is custom designed and sized by the wearer. The transmitter chip is programmable using the provided manufacturer code, or via a dedicated App on a PC or laptop, tablet, or smartphone, with the codes for a variety of locks—door-locks, vehicular locks, padlocks, and so forth.

The Remote Ring is passive RFID and is designed to work with automated, keyless-entry locks, and can store and use the codes for a virtually limitless number of different locks. With the lock programmed, each lock will unlock upon approach or when the user is at a certain proximity (Proximity systems are triggered if a transponder, in this case, if the Remote Ring, is within a certain distance of the lock.) When in range, the Remote Ring's RF transmitter sends the lock an RF signal to unlock. The specific locks RF receiver, then acts to open that lock.

In the Remote Ring, then, consumers will find incredible, space-saving, time-saving, convenience—the sort of invention that will have consumers asking themselves, "Why didn't I think of that?" in the very act of buying it. With the Remote Ring, there will be no more shuffling through the contents of pocket or purse for the right key or key fob, as the individual's approach alone when wearing the Remote Ring conveniently on his or her finger, will unlock any RF-activated, automated lock, programmed by the user—and these active locks are the wave of the future.

The present invention is produced in a variety of materials and styles, suitable for men and women, boys and girls, from a basic molded plastic on up to fine metals such as gold and silver. And, as mentioned, the present invention can be customized. Saving consumers from the need to carry and keep up with multiple keys or key fobs, the present invention will save them time, space, and trouble; and this invention, clever in conception, thoughtful in design, and surprisingly affordable, will find a wide and enthusiastic reception among consumer households, commercial operations, and institutional entities, not only within the United States but around the world.

The present invention holds significant improvements and serves as a remote keyless entry system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, a remote keyless entry system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a wireless communication device and more particularly to a remote keyless entry system as shown in FIGS. 1-5.

Figure 1:
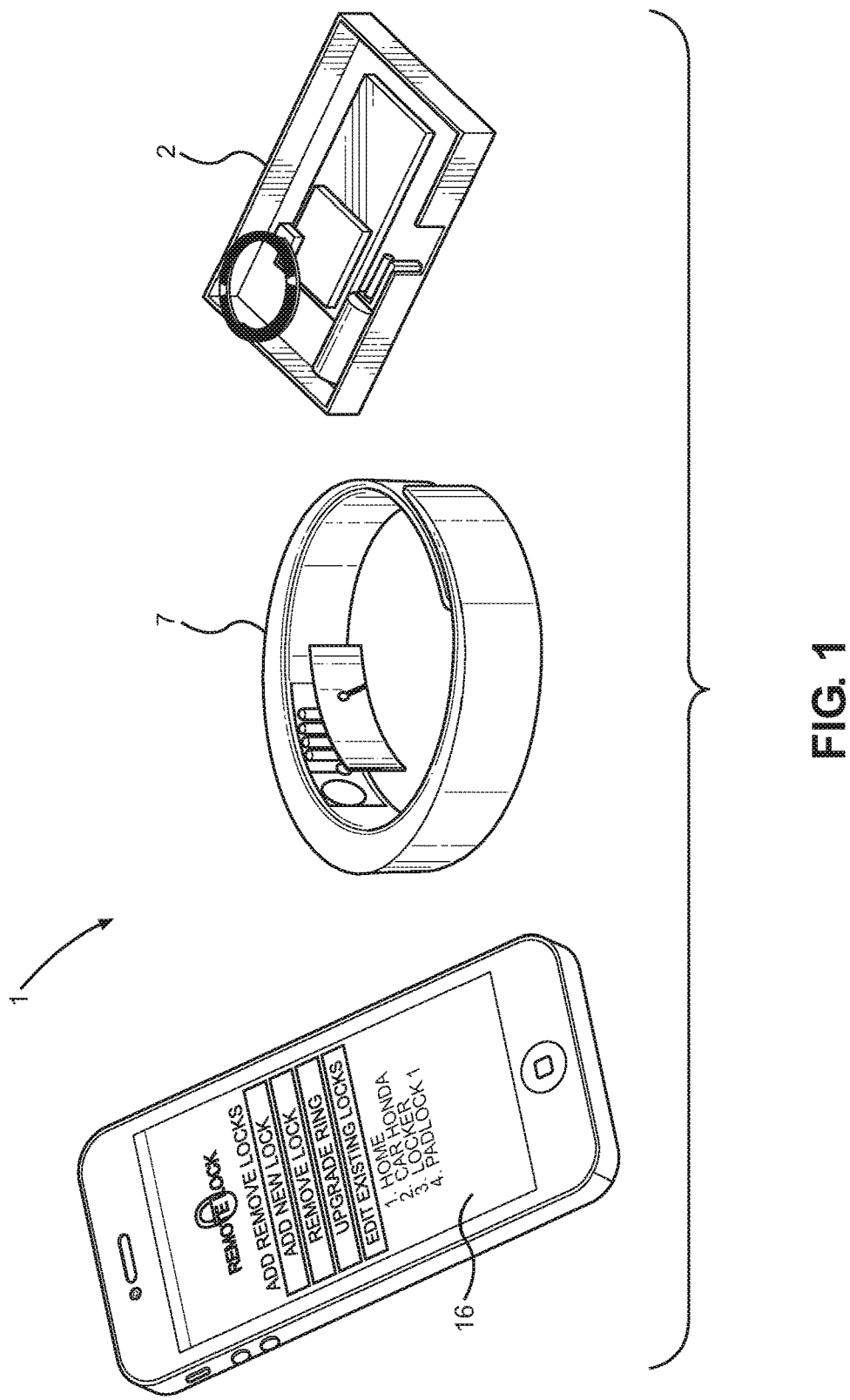
FIG. 1 shows a perspective view illustrating a remote keyless entry system according to an embodiment of the present invention.
Figure 2:
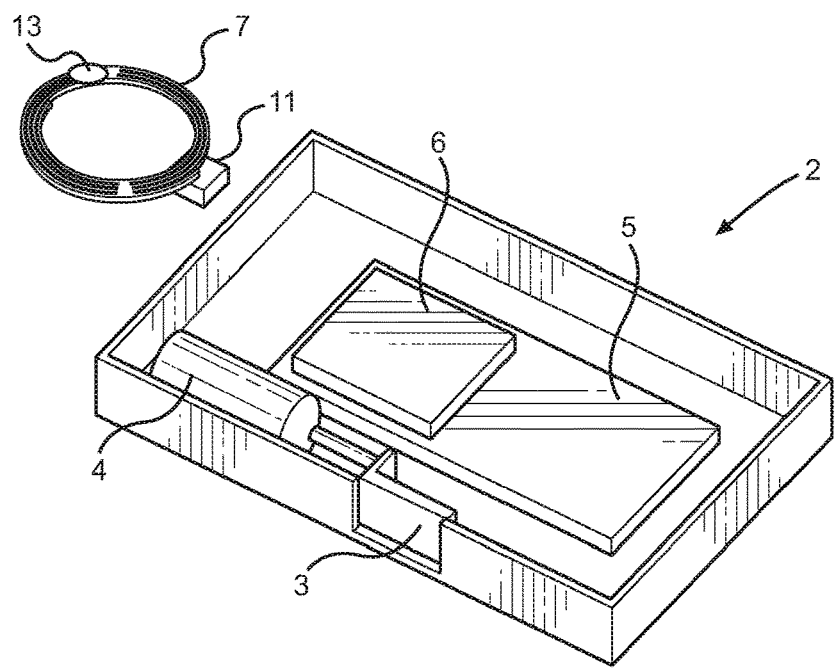
FIG. 2 is an interior view of a lock assembly illustrating a locked position of the lock assembly in communication with an interior view of the lock controller according to an embodiment of the present invention of FIG. 1.
Figure 3:
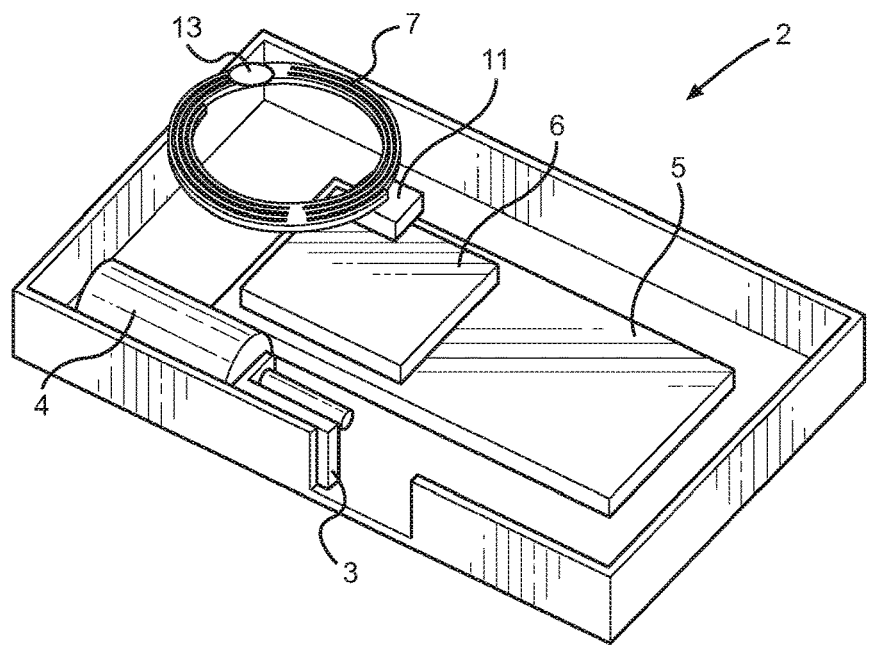
FIG. 3 is an interior view of a lock assembly illustrating an unlocked position of the lock assembly in communication with an interior view of the lock controller according to an embodiment of the present invention of FIG. 1.

Generally speaking, the present invention is a remote keyless entry system 1 as shown in FIG. 1 comprising a representative lock assembly 2, a lock controller 7 and a computer 16. The lock assembly 2 is representative of the workings of a generic lock. As can be seen in FIGS. 2 and 3, the interior of the lock assembly 2 has a movable latch bolt 3 and a solenoid which functions as a motor 4. The motor 4 is mechanically connected to the latch bolt 3 and is adapted to move the latch bolt 3 between a locked position as shown in FIG. 2 and an unlocked position as shown in FIG. 3. FIG. 2 and FIG. 3 show the interior of the lock assembly 2 in communication with the interior elements of lock controller 7 which will be further described in greater detail herein.

As can be seen in FIGS. 2 and 3, the lock assembly 2 also includes a control board 5 which includes a battery which is electronically connected to the motor 4. Also included within the lock assembly 2 is a receiver 6 which is adapted to receive electronic signals from a remote transmitter 11 which is part of the lock controller 7. The receiver 6 is electronically connected to the battery and the motor 4 and is adapted to control the motor 4 and thereby move the latch bolt 3 between the locked position as shown in FIG. 2 and the unlocked position as shown in FIG. 3. The receiver 6 is adapted to receive signals from the transmitter 11 within a certain specified range.

Figure 4:
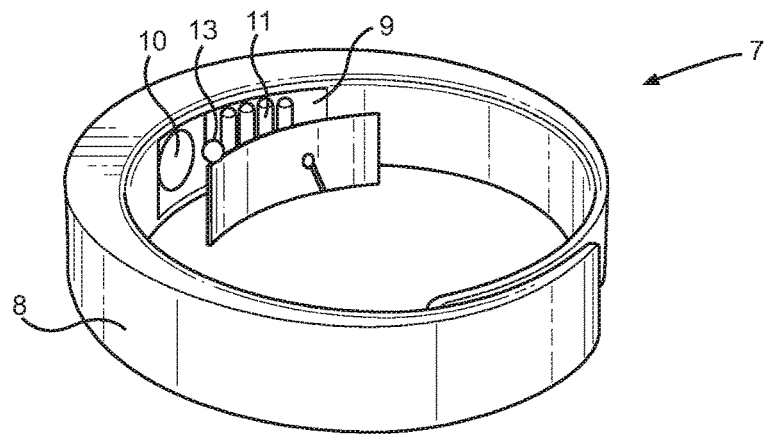
FIG. 4 is a perspective view illustrating a lock controller with the battery cover partially removed illustrating the interior volume according to an embodiment of the present invention of FIG. 1.

The lock controller 7 as seen in FIG. 4 is adapted to remotely unlock the lock assembly 2 when within the afore mentioned specified range. The lock controller 7 comprises a housing 8 having a hollow interior volume 9 which contains a battery member 10 and the afore mentioned transmitter 11. The transmitter 11 is electrically connected to the battery member 10 and is adapted to send electronic signals to the receiver 6 of the lock assembly 2 to thereby unlock it.

The housing 8 has an adjustable cylindrical shape formed of a flexible material and is adapted to fit over a person's finger. In another embodiment, not shown, the housing 8 is formed as an adjustable band adapted to fit over a person's wrist depending on the preference of the user.

Referring back to FIG. 2 and FIG. 3, the lock assembly 2 further comprises computer circuitry which is electronically connected to the battery and motor 4 and is on the control board 5 of the lock assembly 2 and is encoded with a lock code to activate the motor 4 and unlock the lock assembly 2.

The lock controller 7 further comprises a receiver 13, shown in FIGS. 2,3 and FIG. 4, which is located within the interior volume 9 of the housing 8 and is electronically connected to the battery member 10 of the lock controller 7. Computer circuitry is also located within the interior volume 9 of the housing 8 and is electronically connected to the battery member 10 of the lock controller 7. A computer application is encoded upon the computer circuitry and is adapted to be encoded with a lock code matching the lock code of the lock assembly 2 to thereby unlock the lock assembly 2.

The computer member 16 is chosen from a list comprising a smart phone or a tablet or a laptop as chosen by the user. The computer member 16 includes computer circuitry with a computer application APP, encoded thereon which is adapted to be encoded with a plurality of lock codes to thereby open a plurality of different lock assemblies 2. The computer member 16 further comprises a battery which is electronically connected to the computer circuitry. A transmitter is also electronically connected to the battery and is adapted to send RF electronic signals which are constantly emitted from the lock controller 7 to the receivers 6 of the lock assemblies 2. The lock controller 7 is encoded with the same lock code as the lock assemblies 2 such that when the lock controller 7 is within a certain specified range, a lock assembly 2 unlocks automatically.

The computer member 16 is therefore adapted to encode the lock assembly 2 and lock controller 7 with the same lock code such that the lock controller 7 is capable of remotely unlocking the lock assembly 2. The computer member 16 is adapted to encode the lock assembly computer circuitry with a command to a set range for receiving electronic signals from the lock controller 7 such that the lock assembly 2 only unlocks when the lock controller 7 is within that range.

Figure 5A:
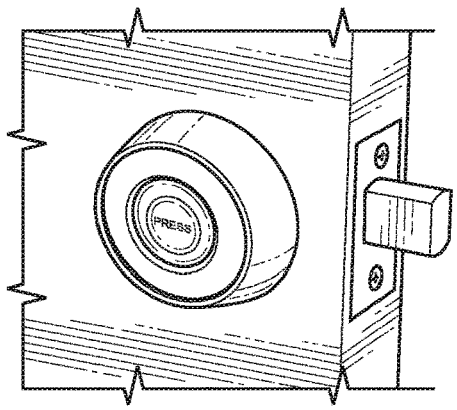
FIGS. 5A-C. show different types of lock assemblies that may be used with the remote keyless entry system of the present invention.
Figure 5B:
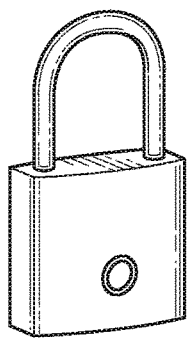
Figure 5C:
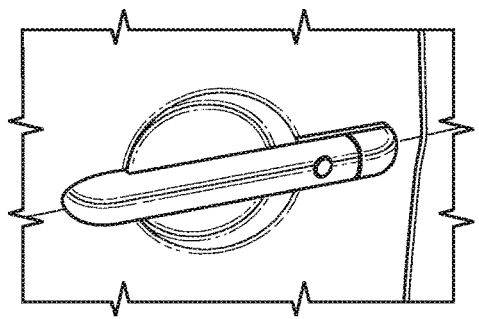

FIGS. 5A-C shows different types of locks that are used with the remote keyless entry system 1 such as car locks 5C, home door locks 5A or padlocks 5B.

Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A remote keyless entry system comprising; a lock assembly including: a movable latch bolt; a motor; wherein said motor is mechanically connected to said latch boll and adapted to move said latch bolt between a locked position and an unlocked position; a battery; wherein said battery is electronically connected to said motor; a receiver; wherein said receiver is adapted to receive electronic signals from a remote transmitter wherein said receiver is electronically connected to said battery and said motor and adapted to control said motor and thereby move said latch bolt between said locked position and said unlocked positions; and wherein said receiver is adapted to receive signals from said transmitter within a predetermined range; a lock controller comprising: a housing; wherein said housing forms a hollow interior volume; a battery; wherein said battery is located within said interior volume; and a transmitter; wherein said transmitter is located within said interior volume and is electrically connected to said battery member; and wherein said transmitter is adapted to send electronic signals to said receiver of said lock assembly; wherein said lock controller is adapted to remotely unlock said lock assembly when within said predetermined range; wherein said housing is formed having an adjustable hand adapted to fit over a person's finger; wherein the housing has an opening on an inside to house the electronics including at least the battery and the transmitter and a lid to be placed on the opening on the inside.

2. The remote keyless entry system of claim 1, wherein said lock assembly further comprises: computer circuitry; wherein said computer circuitry is electronically connected to said battery member and motor of said lock assembly and is encoded with a lock code to activate said motor and unlock said lock assembly.

3. The remote keyless entry system of claim 2, wherein said lock controller further comprises: a receiver; wherein said receiver is located within said interior volume of said housing and is electronically connected to said battery member; computer circuitry; wherein said computer circuitry is located within said interior volume of said housing and is electronically connected to said battery member; a computer application; wherein said computer application is encoded upon said computer circuitry and adapted to be encoded with a lock code matching said lock code of said lock assembly to thereby unlock said lock assembly.

4. The remote keyless entry system of claim 3, further comprising a computer member including: computer circuitry; a computer application; wherein said computer application is encoded upon said computer circuitry and adapted to be encoded with a plurality of lock codes to thereby open a plurality of different lock assemblies; a battery; wherein said battery is electronically connected to said computer circuitry; a transmitter; wherein said transmitter is electronically connected to said battery and adapted to send electronic signals to said receivers of said lock assembly and said lock controller to thereby encode said lock assembly and said lock controller with the same lock code; wherein said computer member is adapted to encode said lock assembly and said lock controller with the same lock code, such that said lock controller is capable of remotely unlock said lock assembly.

5. The remote keyless entry system of claim 4, wherein said computer member is adapted to encode said lock assembly computer circuitry with a command to set a range for receiving electronic signals from said lock controller, such that said lock assembly only unlocks when said lock controller is within said range.

6. The remote keyless entry system of claim 5, wherein said computer member is chosen from a list of computer members consisting of a small phone, a tablet, and a laptop.

7. The remote keyless entry system of claim 5, wherein said electronic signals are RF signals.

8. The remote keyless entry system of claim 7, wherein said RF signals are constantly emitted from said lock controller, such that when said lock controller is within said range said lock assembly unlocks automatically.

9. The remote keyless entry system of claim 1 wherein said adjustable band is formed from a flexible material.

10. The remote keyless entry' system of claim 9, wherein said flexible material is chosen from a list of flexible materials consisting of rubber, silicon, and plastic.

* * * * *